(12) United States Patent
McAfee et al.

(10) Patent No.: US 6,442,886 B1
(45) Date of Patent: Sep. 3, 2002

(54) LURE RETRIEVAL SYSTEM

(76) Inventors: John W. McAfee, 1566 W. Maplewood St., Chandler, AZ (US) 85248; Dennis G. Bredvik, 4140 W. Colter, Phoenix, AZ (US) 85019

( * ) Notice: Subject to any disclaimer, the term of this patent is extended or adjusted under 35 U.S.C. 154(b) by 0 days.

(21) Appl. No.: 09/693,376

(22) Filed: Oct. 20, 2000

Related U.S. Application Data

(60) Provisional application No. 60/169,220, filed on Dec. 6, 1999.

(51) Int. Cl.[7] ............................................. A01K 97/24
(52) U.S. Cl. ....................................................... 43/17.2
(58) Field of Search .......................................... 43/17.2

(56) References Cited

U.S. PATENT DOCUMENTS

| | | | | | |
|---|---|---|---|---|---|
| 2,593,716 A | * | 4/1952 | Allen | ......................... | 43/17.2 |
| 2,597,229 A | * | 5/1952 | Cox | ........................... | 43/17.2 |
| 2,627,691 A | * | 2/1953 | Bress | ......................... | 43/17.2 |
| 2,779,120 A | * | 1/1957 | Moore | ........................ | 43/17.2 |
| 3,012,355 A | * | 12/1961 | Cottrell | ..................... | 43/17.2 |
| 3,156,064 A | * | 11/1964 | Czirr | .......................... | 43/17.2 |
| 3,178,846 A | * | 4/1965 | Hansen | ....................... | 43/17.2 |
| 3,382,599 A | * | 5/1968 | Beverley | .................... | 43/17.2 |
| 3,550,303 A | * | 12/1970 | Western | ...................... | 43/17.2 |
| 3,922,810 A | * | 12/1975 | Kelly | .......................... | 43/17.2 |
| 4,085,537 A | * | 4/1978 | Todd | .......................... | 43/17.2 |
| 4,598,493 A | * | 7/1986 | O'Brien et al. | .............. | 43/17.2 |
| 4,766,689 A | * | 8/1988 | Stinar, Sr. et al. | ........... | 43/17.2 |

* cited by examiner

*Primary Examiner*—Darren W. Ark
(74) *Attorney, Agent, or Firm*—Martin L. Stoneman

(57) ABSTRACT

A fishing lure retriever system for retrieving an artificial fishing lure that has become snagged in underwater debris. The fishing lure retriever provides a round cylindrical hollow body, preferably a heavy metal such as steel in construction, which is removably attached to a fishing line through a spiraling diagonal slot in the body such that the retriever is centered around the fishing line and can impact the debris that has snagged the fishing lure. The fishing line is prevented from slipping out of the retriever by the spiral shape of the slot and U-shaped blockers blocking the slot ends. In addition, the retriever has chains weldably attached to the bottom end portion of the retriever to capture the hooks of the snagged fishing lure. Furthermore, the fishing lure retriever has a retrieval line attached to an upside-down-V-shaped bar welded to the top of the body for pulling on the retriever. The capturing of the hooks and combined impacting of the debris and pulling of the retrieval line attached to the V-shaped bar combine to efficiently retrieve a snagged lure.

13 Claims, 2 Drawing Sheets

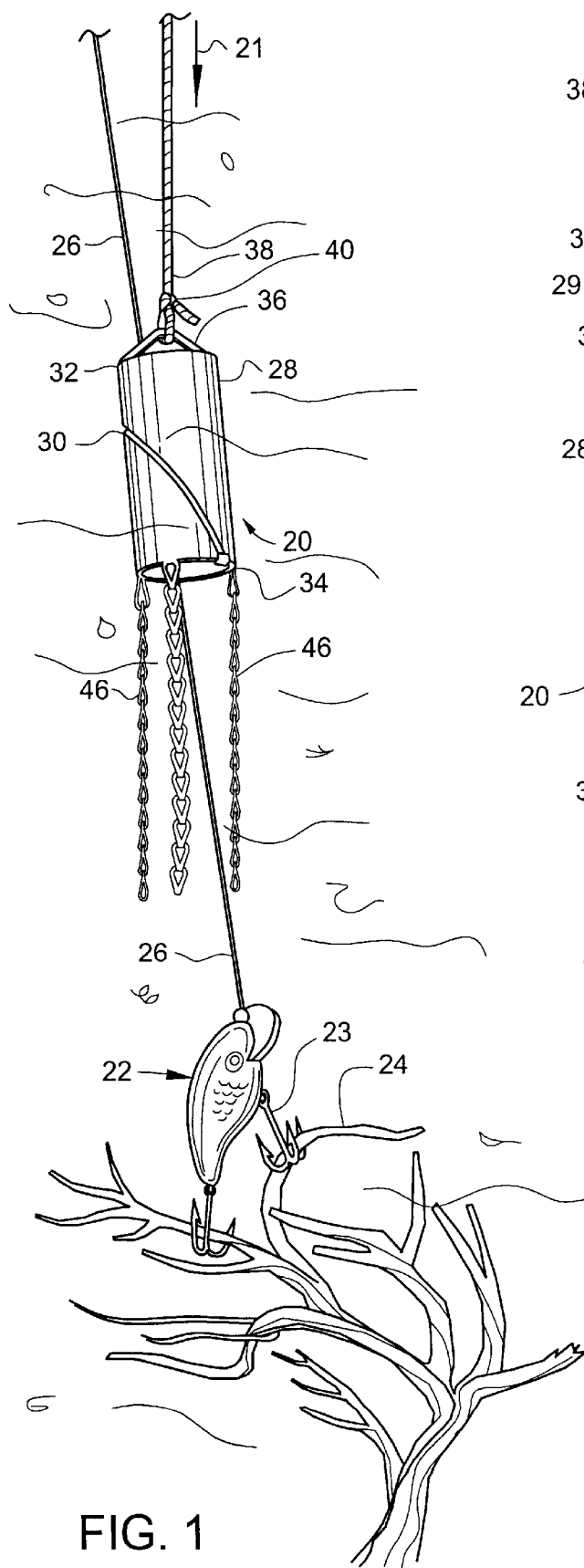
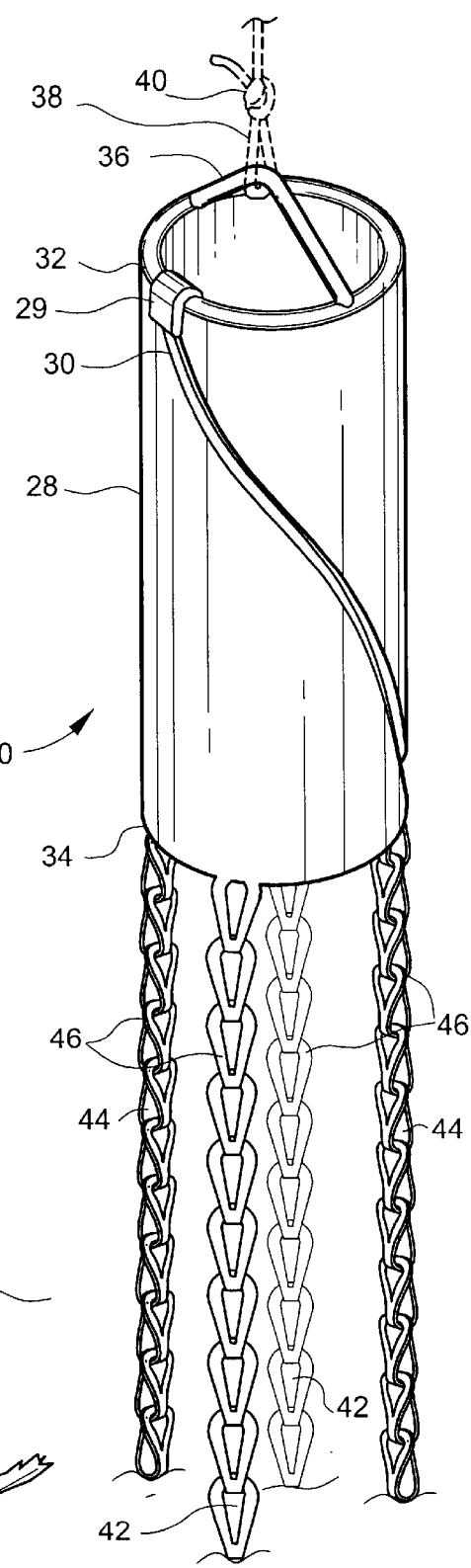
FIG. 1
FIG. 2

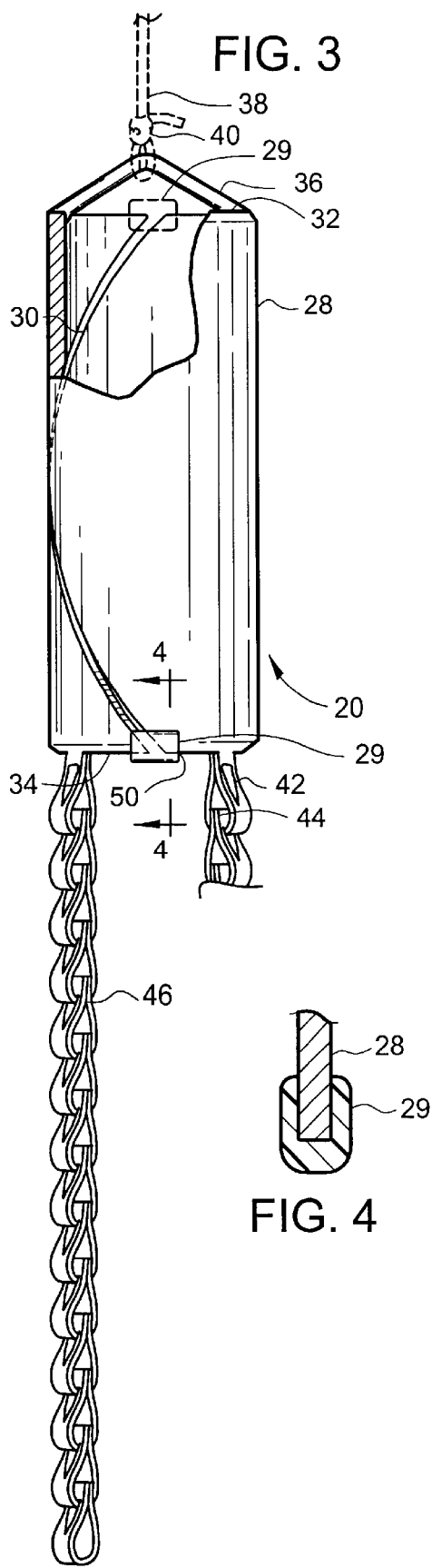
FIG. 3
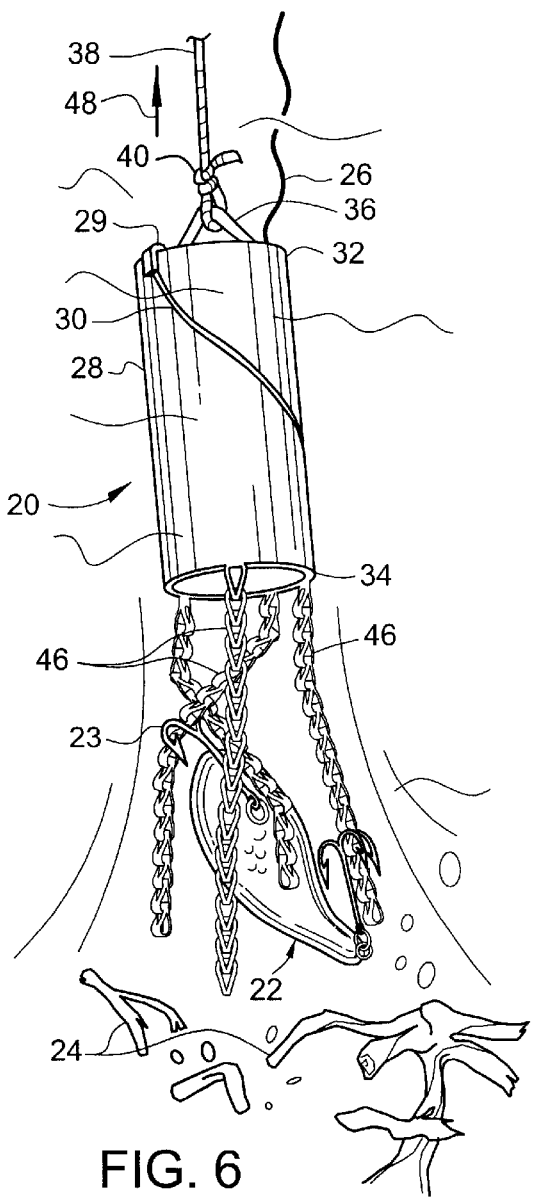
FIG. 6
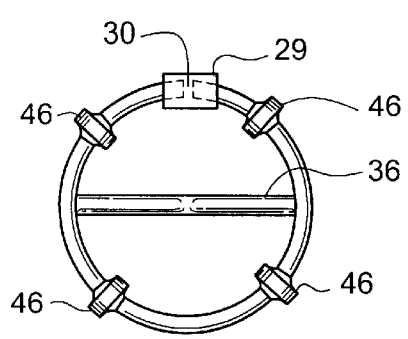
FIG. 4
FIG. 5

LURE RETRIEVAL SYSTEM

CROSS-REFERENCE

The present application is related to and claims priority from applicant's prior provisional application Ser. No. 60/169,220, filed Dec. 6, 1999, entitled "Accessory For Freeing Fishing Lures", the contents of which are hereby herein incorporated by reference.

BACKGROUND OF THE INVENTION

This invention relates to fishing equipment. More specifically, this invention provides a more efficient system for releasing and retrieving an artificial fishing lure that has become snagged in underwater debris.

Typically, fishing lures are used by fisherman when fishing with a casting method. The lures are made from a variety of materials and in a variety of shapes. Typically each lure has one or more fishing hooks that are attached to the lure. In addition, the lures may be either weighted or have weights attached to the line to allow them to be used at different depths of water. Casting involves the fisherman casting a lure and line into a river or lake and then slowly reeling the lure back in. Fishing along the shore or bottom is often a preferred place to catch fish. During this process, the hooks of the lure may become snagged on a variety of debris, including rock or plant debris. Generally, the fisherman will have no choice but to pull on the line to try to free the lure. The pulling may free the lure. If the pulling does not free the lure then either the line may have to be cut or the line may break, both resulting in loss of the lure.

There have been numerous attempts to design a device to free a snagged lure. Many of the devices can be used successfully on occasion, but still too frequently fail. Other devices are too complicated or costly.

OBJECTS OF THE INVENTION

A primary object of the present invention is to fulfill the above-mentioned need by the provision of a fishing lure retrieval system to improve fishing lure retrieval. A further primary object of the present invention is to provide such a fishing lure retrieval system which is efficient, inexpensive, and handy. Other objects of this invention will become apparent with reference to the following invention descriptions.

SUMMARY OF THE INVENTION

According to a preferred embodiment of the present invention, this invention provides a fishing lure retrieval system for capturing a lure having at least one hook, at the end portion of a fishing line, snagged under water by debris, comprising, in combination: an elongated hollow round cylindrical body means for impacting the debris, such body means having a circular top end portion, a circular bottom end portion, and a middle portion; entry means in such body means for permitting removable entry of the fishing line into an interior of such body means, such entry means comprising a slot having a diagonal portion in such middle portion; blocker means for physically blocking exit of the fishing line from at least one such end portion of such body means. It also provides such a fishing lure retrieval system further comprising, attached to such body means at such circular bottom end portion, snaring means for snaring the hook. And it provides such a fishing lure retrieval system further comprising, attached to such body means at such circular top end portion, attachment means for attaching a retrieval line to such body means.

Further it provides such a system wherein such attachment means comprises centering means for maintaining symmetrical forces by centering the retrieval line at about a center of such circular top end portion. And still further it provides such a system wherein such blocker means comprises friction means for removable attachment onto such body means in such manner as to cover at least one end portion of such slot.

Additionally, according to a preferred embodiment of the present invention, this invention provides a fishing lure retrieval system for capturing a lure having at least one hook, at the end portion of a fishing line, snagged under water by debris, comprising, in combination: an elongated hollow round cylindrical body structured and arranged to impact the debris, such body having a circular top end portion, a circular bottom end portion, and a middle portion; at least one slot in such body for permitting removable entry of the fishing line into an interior of such body, such slot having a diagonal portion in such middle portion; and at least one blocker structured and arranged to physically block exit of the fishing line from at least one such end portion of such body. And it provides such a fishing lure retrieval system further comprising, attached to such body at such circular bottom end portion, a snare structured and arranged to snare the hook. Still further, it provides such a system further comprising, attached to such body at such circular top end portion, an attachment structured and arranged to attach a retrieval line to such body.

Even further, it provides such a fishing lure retrieval system wherein such attachment is structured and arranged to maintaining symmetrical forces by centering the retrieval line at about a center of such circular top end portion; and, further, wherein such blocker is structured and arranged to removably attach by friction onto such body in such manner as to cover at least one end portion of such slot; and, further, wherein such blocker is structured and arranged to removably attach by friction onto such body in such manner as to cover at least one end portion of such slot.

Moreover, it provides such a fishing lure retrieval system wherein such slot comprises a diagonal slot in such body, such slot intersecting such circular top end portion at a first intersection and such circular bottom end portion at a second intersection, such first and second intersections being situated about 180 degrees from each other; and such slot intersects a plane of both such circular top end portion and such circular bottom end portion at an angle of about 45 degrees. And it provides such a fishing lure retrieval system wherein each such blocker comprises a respective U-shaped blocker, each fitting tightly over a respective such first and second intersection and frictionally clamping onto such body. And further, it provides such a fishing lure retrieval system wherein such attachment comprises an upside-down V-shaped retrieval line tie bar located about along a diameter to and above such cylindrical body. And still further, it provides such a fishing lure retrieval system wherein such snare comprises a spaced plurality of chains. Even further, it provides such a fishing lure retrieval system wherein such body comprises a steel tube at least about ⅛ inch thick; such slot intersects a plane of both such circular top end portion and such circular bottom end portion at an angle of about 45 degrees; and such body is about four inches long and has about a two-inch outer diameter.

In addition, according to a preferred embodiment of the present invention, this invention provides a fishing lure retrieval system for capturing a lure having at least one hook, at the end portion of a fishing line, snagged under water by debris, comprising, in combination: an elongated hollow round cylindrical body having a circular top end portion, a circular bottom end portion, and a middle portion; a diagonal slot in such body, such slot intersecting such circular top end portion at a first intersection and such circular bottom end portion at a second intersection, such first and second intersections being situated about 180 degrees from each other; two respective U-shaped blockers, each fitting tightly over a respective such first and second intersection and frictionally clamping onto such body; attached to such body at such circular bottom end portion, a spaced plurality of chains; and attached to such body at such circular top end portion, an upside-down V-shaped retrieval line tie bar located about along a diameter to and above such cylindrical body. It also provides such a fishing lure retrieval system wherein such body and tie bar comprise a unitary construction and such chains are welded to such body. And it provides such a system wherein: one end of such tie bar is attached to such body at about 90 degrees from such first intersection; and such spaced plurality of chains comprises four chains spaced equally around such circular bottom end portion, wherein at least two of such chains are each attached to such body at about 45 degrees from such second intersection.

Even further, it provides such a fishing lure retrieval system wherein: such body comprises a steel tube at least about 1/8 inch thick; such slot intersects a plane of both such circular top end portion and such circular bottom end portion at an angle of about 45 degrees; such body is about four inches long and has about a two-inch outer diameter; and each such chain is about six inches long.

BRIEF DESCRIPTION OF THE DRAWINGS

FIG. 1 is a perspective view of a preferred embodiment of the present invention illustrating a fishing lure retrieval system.

FIG. 2 is a perspective view of the embodiment of FIG. 1.

FIG. 3 is a perspective view partially in section of the illustrated preferred embodiment.

FIG. 4 is a sectional view through the section 4—4 of FIG. 3.

FIG. 5 is a bottom view of the illustrated preferred embodiment.

FIG. 6 is a perspective view of the illustrated preferred embodiment.

DETAILED DESCRIPTION OF A PREFERRED EMBODIMENT OF THE INVENTION

Illustrated in FIG. 1 is an improved fishing lure retriever 20. The fishing lure retriever 20 is shown in an operating mode as it is being lowered (see arrow 21) towards a snagged fishing lure 22, illustrated as being snagged on a plant limb 24. The fishing lure 22 has one or more hooks 23 which is the portion of the lure 22 that typically snags onto an object. The fishing lure retriever 20 is placed onto the fishing line 26. The fishing lure retriever 20 is then lowered (see arrow 21) along the fishing line 26 which is attached to the fishing lure 22. Attached to the fishing lure retriever 20 is a nylon retrieval line 38 which is used to lower and raise the fishing lure retriever 20. The nylon retrieval line 38 is positioned on the present invention to be more centered above the fishing lure retriever 20, increasing the effectiveness of the fishing lure retriever 20. Preferably, in operation, the fishing lure retriever 20 is in as near a vertical position to the snagged fishing lure 22 as possible. The fishing lure retriever 20 is lowered to a depth to contact the snagged fishing lure 22. The remaining operation of the fishing lure retriever 20 will be explained further below.

Illustrated in FIG. 2 is a preferred embodiment of the fishing lure retriever 20. The fishing lure retriever 20 is comprised of a hollow cylindrical body 28 approximately four inches in length and 1¾ inches in interior diameter (two inches outer diameter). The hollow cylindrical body 28 is preferably round at the top portion 32 and bottom portion 34, as shown. The above arrangement embodies herein an elongated hollow round cylindrical body means for impacting the debris, such body means having a circular top end portion, a circular bottom end portion, and a middle portion; and it also embodies herein an elongated hollow round cylindrical body structured and arranged to impact the debris, such body having a circular top end portion, a circular bottom end portion, and a middle portion; and it even further embodies that such body is about four inches long and has about a two-inch outer diameter.

The fishing lure retriever 20 is made of metal, preferably 1/8 inch thick steel, embodying herein that such body comprises a steel tube at least about 1/8 inch thick. In order to avoid the corrosive properties of water on standard steel, the steel preferably has a protective coating applied over it. In one preferred embodiment of the present invention, the steel has a water-resistant coating applied to the entire body. The coating is preferably an enamel baked powder coating. In another preferred embodiment, although more expensive, the metal is stainless steel and does not require a coating. The steel material is preferred to provide adequate weight for proper retriever 20 functioning.

The fishing lure retriever 20 is installed around the fishing line 26 by inserting the fishing line 26 through a slot 30 that is preferably cut in a diagonal shape (i.e., a spiral having an essentially constant angle to the horizontal (assuming the retriever is used vertically) extending vertically from the top 32 of the fishing lure retriever 20 through and to the bottom 34 of the fishing lure retriever 20. The above arrangement (as shown) embodies herein entry means in such body means for permitting removable entry of the fishing line into an interior of such body means, such entry means comprising a slot having a diagonal portion in such middle portion; and it further embodies at least one slot in such body for permitting removable entry of the fishing line into an interior of such body, such slot having a diagonal portion in such middle portion; and it still further embodies herein a diagonal slot in such body, such slot intersecting such circular top end portion at a first intersection and such circular bottom end portion at a second intersection, such first and second intersections being situated about 180 degrees from each other. The slot 30 is cut spirally such that it extends approximately 180 degrees around the body 28 (illustrated in FIG. 3). This arrangement embodying herein that such slot comprises a diagonal slot in such body, such slot intersecting such circular top end portion at a first intersection and such circular bottom end portion at a second intersection, such first and second intersections being situated about 180 degrees from each other. The slot 30 is cut such that it intersects the top 32 and bottom 34 of the fishing lure retriever at an angle of about 45 degrees, embodying herein that such slot intersects a plane of both such circular top end portion and such circular bottom end portion at an angle of about 45 degrees.

After the fishing line 26 has been inserted into the fishing lure retriever 20, the fishing line 26 is prevented from coming out of the hollow cylindrical body 28 (a problem in the prior art) by the combined use of a removably attached U-shaped blocker 29 and the configuration of the spiral slot 30. Preferably, a U-shaped blocker 29 is attached at both ends of the slot 30. The U-shaped blocker 29 blocks the fishing line 26 such that the line 26 cannot exit the hollow cylindrical body 28. This arrangement embodies herein blocker means for physically blocking exit of the fishing line from at least one such end portion of such body means; and it further embodies herein at least one blocker structured and arranged to physically block exit of the fishing line from at least one such end portion of such body. Preferably, the U-shaped blocker (shaped and sized as shown) is made of a suitable plastic material, etc., to be able to be pushed onto the cylinder-body of the retriever and held in place by friction. Preferably, that is, the U-shaped blocker is structured such that it must be stretched to fit onto the hollow steel body such that it attaches over slot 30 by friction means to the hollow steel body. This arrangement embodies herein that such blocker is structured and arranged to removably attach by friction onto such body in such manner as to cover at least one end portion of such slot; and it also embodies herein that each such blocker comprises a respective U-shaped blocker, each fitting tightly over a respective such first and second intersection and frictionally clamping onto such body. An added feature of the preferred embodiment of the present invention is the use of the spiral slot 30, which acts both by itself and in combination with the U-shaped blocker 29 to block the fishing line 26 from coming out of the fishing lure retriever 20.

Preferably, the fishing lure retriever 20 has a "V"-shaped bar 36 which is used (as shown) as an attachment for the nylon retrieval line 38. The V-shaped bar 36 is preferably a solid ¼-inch thick round steel bar. The V-shaped bar 36 is preferably welded to the top 32 of the fishing lure retriever 20 in an upside down position, as shown. This arrangement embodies herein, attached to such body means at such circular top end portion, attachment means for attaching a retrieval line to such body means; and it also embodies herein, attached to such body at such circular top end portion, an attachment structured and arranged to attach a retrieval line to such body. The upside-down "V" is positioned such that it is centered along the diameter of the hollow cylindrical body 28, embodying herein that such attachment comprises an upside-down V-shaped retrieval line tie bar located about along a diameter to and above such cylindrical body. The above arrangement also embodies herein, attached to such body at such circular top end portion, an upside-down V-shaped retrieval line tie bar located about along a diameter to and above such cylindrical body; and it further embodies herein that such attachment means comprises centering means for maintaining symmetrical forces by centering the retrieval line at about a center of such circular top end portion.

The position of the V-shaped bar 36 allows the nylon retrieval line 38 to be more centered above the fishing lure retriever 20, increasing the effectiveness of the fishing lure retriever 20. Preferably the V-shaped bar 36 is positioned (as shown) such that it is oriented perpendicular or 90 degrees from the opening of the top 32 of the spiral slot 30 (see FIGS. 3 and 5). This arrangement embodies herein that one end of such tie bar is attached to such body at about 90 degrees from such first intersection. Preferably, a nylon retrieval line 38 is removably attached to the V-shaped bar 36. The nylon retrieval line 38 is preferably a minimum ⅛ inch diameter nylon of sufficient strength (at least about 200–250 pound test line) to resist breaking when pulling the fishing lure retriever 20 to release the snagged fishing lure 22 (further explained below in reference to FIG. 6). Preferably, the nylon retrieval line 38 is removably attached to the V-shaped bar 36 by the use of a knot 40. The knot 40 is tied to avoid coming loose during operation of the fishing lure retriever 20.

With reference to FIG. 2, attached to the bottom 34 of the fishing lure retriever 20 are preferably four chains 46 (as shown). The four chains 46 embody herein that, attached to such body means at such circular bottom end portion, is snaring means for snaring the hook; and they further embody herein that such snare comprises a spaced plurality of chains. The chains 46 are each preferably 6 inches in length, embodying herein that each such chain is about six inches long. The chains 46 are preferably formed as illustrated in FIG. 2. The chains 46 have openings along both the face 42 and side 44 to snatch the hooks 23 on the fishing lure 22, embodying herein, attached to such body at such circular bottom end portion, a snare structured and arranged to snare the hook. The chains 46 are preferably attached to the hollow cylindrical body 28 by welding, embodying herein that such chains are welded to such body. The chains 46 are preferably attached at a location approximately 45 degrees on each side of and from the bottom 34 slot end 50, embodying herein that such spaced plurality of chains comprises four chains spaced equally around such circular bottom end portion, wherein at least two of such chains are each attached to such body at about 45 degrees from such second intersection. The arrangement further embodies herein, attached to such body at such circular bottom end portion, a spaced plurality of chains. The four chains 46 are preferably attached to the body at 90 degree increments (as shown in FIGS. 3 and 5).

Referring now to FIG. 3, illustrated is the spiral slot 30 and the blocker 29. As previously discussed above, the spiral slot is used to assist in keeping the fishing line 26 (shown in FIG. 1) from slipping out of the fishing lure retriever 20. A secondary blocker is used to further secure the fishing line 26. The secondary blocker is a U-shaped blocker 29 which is illustrated in cross-section in FIG. 4. The U-shaped blocker 29 is preferably made of plastic, but may be made of any of a variety of materials that would also perform a similar function. The U-shaped blocker 29 is placed at both ends of the slot 30, as shown in FIG. 3. The U-shaped blocker 29 is slipped or pushed onto the ⅛ inch thickness of the hollow cylindrical body 28 such that the slot 30 is completely covered (as shown). The U-shaped blocker 29 is fitted tightly around the edge of the hollow cylindrical body 28. The U-shaped blocker 29 is preferably held on the hollow cylindrical body 28 by friction.

FIG. 5 represents a bottom view of the fishing lure retriever 20. Illustrated in FIG. 5 is the preferred position of the slot 30, blocker 29, V-shaped bar 36 and chains 46 as previously described above. Also illustrated in FIG. 5 is the fishing lure retriever 20 hollow cylindrical body 28.

FIG. 6 further illustrates the operation of the fishing lure retriever 20. As previously explained in FIG. 1, the fishing lure 22 has one or more hooks 23, being the portion of the lure 22 that snags onto an object. The fishing lure retriever 20 is placed onto the fishing line 26 by slipping the fishing line 26 through the spiral slot 30. A U-shaped blocker 29 is then placed over each end of the slot 30. The fishing lure retriever 20 is then lowered (see arrow 21) along the fishing line 26 which is attached to the fishing lure 22. Attached to the fishing lure retriever 20 is a nylon retrieval line 38 which is used to lower and raise the fishing lure retriever 20. Preferably, the fishing lure retriever 20 is in as near a vertical position to the snagged fishing lure 22 as possible. The fishing lure retriever 20 is lowered to a depth to contact debris and/or the snagged fishing lure 22. Preferably, the operator uses the nylon retrieval line 38 to bounce the fishing lure retriever 20 in an up an down motion to free the snagged lure 22. The weight of the lure usually forces the lure 22 downward and is usually sufficient to free the snagged lure 22. If the lure 22 continues to be snagged, the operator will preferably rotate the device in a circular manner and jiggle the nylon retrieval line 38 in an up and down manner. This motion is intended to cause the chains 46 to entangle one or more of the hooks 23 of the snagged lure 22. When the hooks 23 are entangled, the operator uses the nylon retrieval line 38 to pull the lure in an upward motion (see arrow 48). The fishing lure retriever 20 will free the snagged lure 22 and may, as illustrated, break the object (in this case a plant limb 24) on which the lure 22 was snagged. The lure 22 is then raised and retrieved by the operator.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A fishing lure retrieval system for capturing a lure having at least one hook, at the end portion of a fishing line, snagged under water by debris, comprising, in combination:
    a) an elongated hollow round cylindrical body structured and arranged to impact the debris, said body having a circular top end portion, a circular bottom end portion, and a middle portion;
    b) at least one slot, in said body, structured and arranged to permit removable entry of the fishing line into an interior of said body, said slot having a diagonal portion in said middle portion;
    c) at least one blocker structured and arranged to physically block exit of the fishing line from at least one of said top and bottom end portions of said body; and
    d) wherein said slot intersecting said circular top end portion at a first intersection and said circular bottom end portion at a second intersection; and
    e) wherein said at least one blocker is structured and arranged to removably attach by friction onto said body in such a manner as to cover at least one end portion of said slot at at least one of said first and second intersections.

2. The fishing lure retrieval system according to claim 1 further comprising, attached to said body at said circular bottom end portion, a snare structured and arranged to snare the at least one hook.

3. The fishing lure retrieval system according to claim 2 further comprising, attached to said body at said circular top end portion, an attachment structured and arranged to attach a retrieval line to said body.

4. The fishing lure retrieval system according to claim 3 wherein said attachment is structured and arranged to maintain symmetrical forces by centering the retrieval line at about a center of said circular top end portion when the retrieval line is attached to said attachment.

5. The fishing lure retrieval system according to claim 4 wherein:
    a) said first and second intersections being situated about 180 degrees from each other; and
    b) said slot intersects planes of said circular top end portion and said circular bottom end portion at an angle of about 45 degrees.

6. The fishing lure retrieval system according to claim 5 wherein said at least one blocker comprises a pair of blockers, each said blocker comprises a respective U-shaped blocker, each fitting tightly over a respective said first and second intersection and frictionally clamping onto said body.

7. The fishing lure retrieval system according to claim 4 wherein said attachment comprises an upside-down-V-shaped retrieval line tie bar located about along a diameter of and above said cylindrical body.

8. The fishing lure retrieval system according to claim 2 wherein said snare comprises a spaced plurality of chains.

9. The fishing lure retrieval system according to claim 1 wherein:
    a) said body comprises a steel tube at least about 1/8 inch thick;
    b) said slot intersects planes of said circular top end portion and said circular bottom end portion at an angle of about 45 degrees; and
    c) said body is about four inches long and has about a two-inch outer diameter.

10. A fishing lure retrieval system for capturing a lure having at least one hook, at the end portion of a fishing line, snagged under water by debris, comprising, in combination:
    a) an elongated hollow round cylindrical body having a circular top end portion, a circular bottom end portion, and a middle portion;
    b) a diagonal slot in said body, said slot intersecting said circular top end portion at a first intersection and said circular bottom end portion at a second intersection, said first and second intersections being situated about 180 degrees from each other;
    c) two respective U-shaped blockers, each fitting tightly over a respective said first and second intersection and frictionally clamping onto said body;
    d) attached to said body at said circular bottom end portion, a spaced plurality of chains; and
    e) attached to said body at said circular top end portion, an upside-down-V-shaped retrieval line tie bar located about along a diameter of and above said cylindrical body.

11. The fishing lure retrieval system according to claim 10 wherein:
    a) said body and said tie bar comprise a unitary construction; and
    b) said chains are welded to said body.

12. The fishing lure retrieval system according to claim 11 wherein:
    a) one end of said tie bar is attached to said body at about 90 degrees from said first intersection; and
    b) said spaced plurality of chains comprises four chains spaced equally around said circular bottom end portion, wherein at least two of said chains are each attached to said body at about 45 degrees from said second intersection.

13. The fishing lure retrieval system according to claim 11 wherein:
    a) said body comprises a steel tube at least about 1/8 inch thick;
    b) said slot intersects a plane of both said circular top end portion and said circular bottom end portion at an angle of about 45 degrees;
    c) said body is about four inches long and has about a two-inch outer diameter; and
    d) each said chain is about six inches long.

* * * * *